United States Patent
Szymanski et al.

(10) Patent No.: US 7,577,455 B2
(45) Date of Patent: Aug. 18, 2009

(54) THREE TURN INTERACTIVE VOICE MESSAGING SYSTEM

(75) Inventors: Margaret H. Szymanski, Santa Clara, CA (US); Paul M. Aoki, Foster City, CA (US); James D. Thornton, Redwood City, CA (US); Allison G. Woodruff, Foster City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 592 days.

(21) Appl. No.: 11/136,984

(22) Filed: May 25, 2005

(65) Prior Publication Data

US 2006/0270361 A1 Nov. 30, 2006

(51) Int. Cl.
- H04Q 7/20 (2006.01)
- H04B 7/00 (2006.01)
- H04M 3/42 (2006.01)

(52) U.S. Cl. .................. 455/519; 455/416; 455/518
(58) Field of Classification Search .......... 455/518, 455/519, 521, 517, 416, 412.1; 379/88.16, 379/88.17, 88.22, 88.12
See application file for complete search history.

(56) References Cited

U.S. PATENT DOCUMENTS

| | | | |
|---|---|---|---|
| 4,247,908 A | 1/1981 | Lockhart et al. | |
| 4,604,064 A | 8/1986 | Boehm et al. | |
| 5,442,809 A | 8/1995 | Diaz et al. | |
| 5,541,981 A | 7/1996 | Lynn | |
| 5,613,201 A | 3/1997 | Alford et al. | |
| 5,664,113 A | 9/1997 | Worger et al. | |
| 5,734,643 A | 3/1998 | Rondeau | |
| 5,940,771 A | 8/1999 | Gollnick et al. | |
| 6,477,150 B1 | 11/2002 | Maggenti et al. | |
| 6,772,335 B2 | 8/2004 | Curtis et al. | |
| 6,904,023 B2 | 6/2005 | Albal et al. | |
| 6,976,081 B2 | 12/2005 | Worger et al. | |
| 6,996,394 B2 * | 2/2006 | Minear et al. | 455/412.1 |
| 7,046,985 B2 | 5/2006 | Seales et al. | |
| 7,123,719 B2 | 10/2006 | Sowa et al. | |
| 7,171,228 B2 * | 1/2007 | Florkey et al. | 455/519 |

(Continued)

OTHER PUBLICATIONS

America Online, Inc., "Mobile AIM © via Text Messaging", Dulles, VA, 2003.

(Continued)

*Primary Examiner*—Tilahun B Gesesse
(74) *Attorney, Agent, or Firm*—Patrick J. S. Inouye; Krista A. Wittman

(57) ABSTRACT

A system for interactive communication among lightweight audio communication devices over a communication network in which an application is stored and executed for use by network devices. The system includes a session management module for management of communication sessions among the audio communication devices. Session management includes receiving an initial message as an audio stream through an audio channel from a first audio communication device, producing a response message within the network devices, and determining whether the first communication device is responsively engaging the response message. The system also includes an audio processing module for storage, retrieval, and transmission of audio communication streams, including sending a response message to the first audio communication device and recording a reply message as an audio stream through the audio channel from a first communication device if the first communication device indicates responsive engagement with the response message.

26 Claims, 8 Drawing Sheets

U.S. PATENT DOCUMENTS

| | | |
|---|---|---|
| 7,203,509 B2 | 4/2007 | Gottschalk et al. |
| 7,260,087 B2 | 8/2007 | Bao et al. |
| 7,283,833 B2 | 10/2007 | Fukui et al. |
| 7,369,868 B2 * | 5/2008 | Dunko et al. ............... 455/517 |
| 7,428,422 B2 * | 9/2008 | Hannu et al. ............... 455/518 |
| 7,433,680 B2 * | 10/2008 | Jenkins et al. ........... 455/412.1 |
| 2003/0012149 A1 | 1/2003 | Maggenti et al. |
| 2003/0018531 A1 | 1/2003 | Mahaffy et al. |
| 2003/0138080 A1 * | 7/2003 | Nelson et al. ............ 379/88.16 |
| 2005/0047362 A1 | 3/2005 | Harris et al. |
| 2005/0143111 A1 | 6/2005 | Fitzpatrick et al. |
| 2005/0164682 A1 * | 7/2005 | Jenkins et al. ........... 455/412.1 |
| 2005/0202806 A1 | 9/2005 | Bourgeois et al. |
| 2005/0242180 A1 | 11/2005 | Byford |
| 2005/0250476 A1 | 11/2005 | Worger et al. |
| 2006/0019655 A1 | 1/2006 | Peacock |
| 2006/0025141 A1 | 2/2006 | Marsh et al. |
| 2006/0045043 A1 | 3/2006 | Crocker et al. |
| 2006/0046697 A1 | 3/2006 | Koren et al. |
| 2006/0046758 A1 | 3/2006 | Emami-Nouri et al. |
| 2006/0058052 A1 | 3/2006 | Plestid et al. |
| 2006/0063553 A1 | 3/2006 | Iyer et al. |
| 2006/0073795 A1 | 4/2006 | Mayblum et al. |
| 2006/0079260 A1 * | 4/2006 | Tillet et al. .................. 455/518 |
| 2006/0106617 A1 | 5/2006 | Falcon et al. |
| 2006/0116151 A1 | 6/2006 | Sullivan et al. |
| 2006/0120516 A1 | 6/2006 | Armbruster et al. |
| 2006/0121924 A1 * | 6/2006 | Rengaraju et al. ........... 455/518 |
| 2006/0142036 A1 * | 6/2006 | Lim ........................... 455/518 |
| 2006/0205436 A1 | 9/2006 | Liu et al. |
| 2007/0230678 A1 | 10/2007 | Bloebaum et al. |

OTHER PUBLICATIONS

Nelson, L., et al., "Quiet Calls: Talking Silently on Mobile Phones", Proc. ACM SIGCHI Conf., ACM, 2001, 174-181.

Pering, C., "Taming of the Ring: Context Specific Social Mediation for Communication Devices", ACM SIGCHI Conf., ACM, 2002, 712-713.

Schmandt, C., et al., "Mediated Voice Communication via Mobile IP", Proc. ACM UIST Symposium, ACM, 2002, 141-150.

* cited by examiner

HANDSET 1 (INITIATOR)

HANDSET 2 (RECIPIENT)

THREE TURN INTERACTIVE VOICE MESSAGING SYSTEM

INCORPORATION BY REFERENCE

The following U.S. patent publications are fully incorporated herein by reference: U.S. Publication Number 2003/0138080 to Nelson et al. ("Multi-channel Quiet Calls").

BACKGROUND

This disclosure relates generally to lightweight audio communication systems and specifically to communication systems in which the message-recording facility is integrated with a lightweight audio communication facility in a three-turn interactive design.

An example of a lightweight audio communication system is the half-duplex, push-to-talk (PTT) "walkie-talkie" audio communication such as provided by Nextel® Communication's "Direct Connect"® service or a similar unit as illustrated in FIG. 5, whose features include push-to-talk button 510. Another type includes PTT desktop Voice over IP (VoIP) audio conferencing systems. Relative to the telephone, the main advantage of using a lightweight audio communication system is that sequences of conversational turns can be initiated with much less effort. One reason for this reduced effort is that the dialing/ringing/connection delay associated with telephone calls does not occur. Another reason is that such systems are generally used within groups of people who have strong preexisting relationships, thus enabling individual interactions that usually bypass the multi-turn "opening" sequences that characterize telephone conversation. The following scenario represents a typical PTT interaction, one in which a first person (the initiator) is trying to contact a second person (the recipient) using a Nextel phone:

EXAMPLE 1

Recipient Available for Interaction

1. Initiator: (pushes PTT), (receives go-ahead "beep"), "Can you come here?"
2. Recipient: (receives "beep" indicating incoming message), (pushes PTT), "Okay."

Dialing, ringing (the "summons" part of an opening sequence), one or more rounds of "hello" ("identification/recognition" and "greetings"), discussion about how one is feeling today ("initial inquiries"), etc., are all missing. Here, the initiator begins with the actual intended topic.

Lightweight audio communication is well-suited for spontaneous interaction, for example, coordination of social activities within groups of friends or of mobile service work within a dispatcher/worker company. For slightly longer-term coordination tasks, it can be helpful to be able to record coordination messages. However, most systems do not provide facilities for recorded messages. Balancing message spontaneity with persistence is a difficult design problem; a badly-designed mechanism for recorded messages would be a burden for users, since "catching up" with a long series of abbreviated, de-contextualized audio messages is potentially even more onerous than "catching up" with longer, but more thoroughly contextualized, voicemail messages. The usual practice for recording messages is to use a separate mechanism, entirely outside of the lightweight audio system—making a telephone call to leave voicemail, SMS on mobile phones, alphanumeric paging, etc. This lack of integration often causes lightweight audio interactions to stall in unpredictable ways. For example, consider the two following scenarios that involve a first person (the initiator) who is attempting to contact a second person (the recipient) who is not currently able or willing to accept a PTT interaction:

EXAMPLE 2

Recipient has his Phone turned off

1. Initiator: (pushes PTT) (receives recipient unavailable "beep")

EXAMPLE 3

Recipient does not Wish to Reply

1. Initiator: (pushes PTT) (receives go-ahead "beep") Can you come here? (20 second pause)

In these instances, the initiating party may initiate a telephone voicemail interaction if the matter is urgent, or may simply begin polling the desired recipient if it is believed (for out of band reasons) that the intended recipient is likely to be available soon. Neither option is particularly efficient or appealing (for either party).

Similarly unappealing options may arise if the recipient is "available" (willing to accept a PTT interaction) but at an inconvenient location for interaction. For example, consider the following scenario, which will again involve an initiator and a recipient. In this case, the recipient is in a loud environment:

EXAMPLE 4

Recipient is in a Loud Environment

1. Initiator: (pushes PTT) (receives go-ahead "beep") Can you come here? (20 second pause)
2. Recipient: (pushes PTT) HELLO?
3. Initiator: (pushes PTT) Can you come here?
4. Recipient: (pushes PTT) YOU HAVE TO SPEAK UP, I'M ON THE CONSTRUCTION SITE To a limited degree, "presence" or "availability" features of the type implemented in systems such as AOL Instant Messenger® or Yahoo!® Messenger can help with some of these situations. However, while consulting a presence/availability display before calling is a plausible course of action for desktop systems, or in mobile phone situations where one is often calling different people (since one is generally selecting from an address book), it is not particularly convenient on mobile phones providing lightweight audio communication such as Nextel. In lightweight audio communication, back-and-forth calls between the same pair of people are so common that the phones have a hardware "initiate call to the person I most recently talked to" button so that users do not have to open their phone and consult their address book again. Hence, consulting the visual display is much more infrequent than in the other situations.

One approach to resolving these problems is to provide a recording mechanism that is tightly integrated with the lightweight audio mechanism, both in terms of system integration as well as the normal flow of human interaction.

BRIEF SUMMARY

The disclosed embodiments provide examples of improved solutions to the problems noted in the above Background discussion and the art cited therein. There is shown in these examples an improved system for interactive communication among lightweight audio communication devices over a communication network in which an application is stored and executed for use by network devices. The system includes a session management module for management of communication sessions among the audio communication devices. Session management includes receiving an initial message as an audio stream through an audio channel from a first audio communication device, producing a response message within the network devices, and determining whether the first communication device is responsively engaging the response message. The system also includes an audio processing module for storage, retrieval, and transmission of audio communication streams, including sending a response message to the first audio communication device and recording a reply message as an audio stream through the audio channel from a first communication device if the first communication device indicates responsive engagement with the response message.

In another embodiment there is provided a system for interactive communication among lightweight audio communication devices over a communication network, with the system storing and executing an application for use by a server accessible by network devices. Within the server, the application includes a session management module for management of communication sessions among the audio communication devices and also an audio processing module for storage, retrieval, and transmission of audio communication streams, including sending a response message to the first audio communication device and recording a reply message as an audio stream through the audio channel from a first communication device if the first communication device indicates responsive engagement with the response message.

In yet another embodiment there is disclosed a system for interactive communication among lightweight audio communication devices over a communication network, the system storing and executing an application for use by at least one audio communication device. Within the audio communication device, the application includes a session management module for management of communication sessions among the audio communication devices, with session management including receiving an initial message as an audio stream through an audio channel from a first audio communication device, producing a response message within the network devices, and determining whether the first communication device is responsively engaging the response message. The system also includes an audio processing module for storage, retrieval, and transmission of audio communication streams.

In yet another embodiment there is provided a system for interactive communication among lightweight audio communication devices over a communication network, with the system storing and executing an application for use by network devices. The system includes the capability for directing an initial message from a first audio communication device to a second audio communication device through an audio channel. Within the network devices a response message is produced and sent to the first audio communication device. A determination is made as to whether the first communication device is responsively engaging the response message. If so, a reply message is recorded as an audio stream and is transmitted from the first audio communication device.

In yet another embodiment there is disclosed a system for interactive communication among lightweight audio communication devices over a communication network, in which the system stores and executes an application for use by network devices. The system includes a session management module, for management of communication sessions among the audio communication devices involving at least a first audio communication device and a second audio communication device for communicating at least one initial message over an audio channel. An audio processing module stores, retrieves, and transmits audio communication streams. A state assessment module determines the readiness of a second audio device to accept incoming communication requests. A manual state monitoring module monitors activity of at least one control input device and provides manual state monitoring data retrieved from the control input device to the state assessment module. A network status monitoring module receives network status data, and a context-based state monitoring module monitors at least one context sensor included in the audio communication devices and provides context-based state monitoring data to the state assessment module.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
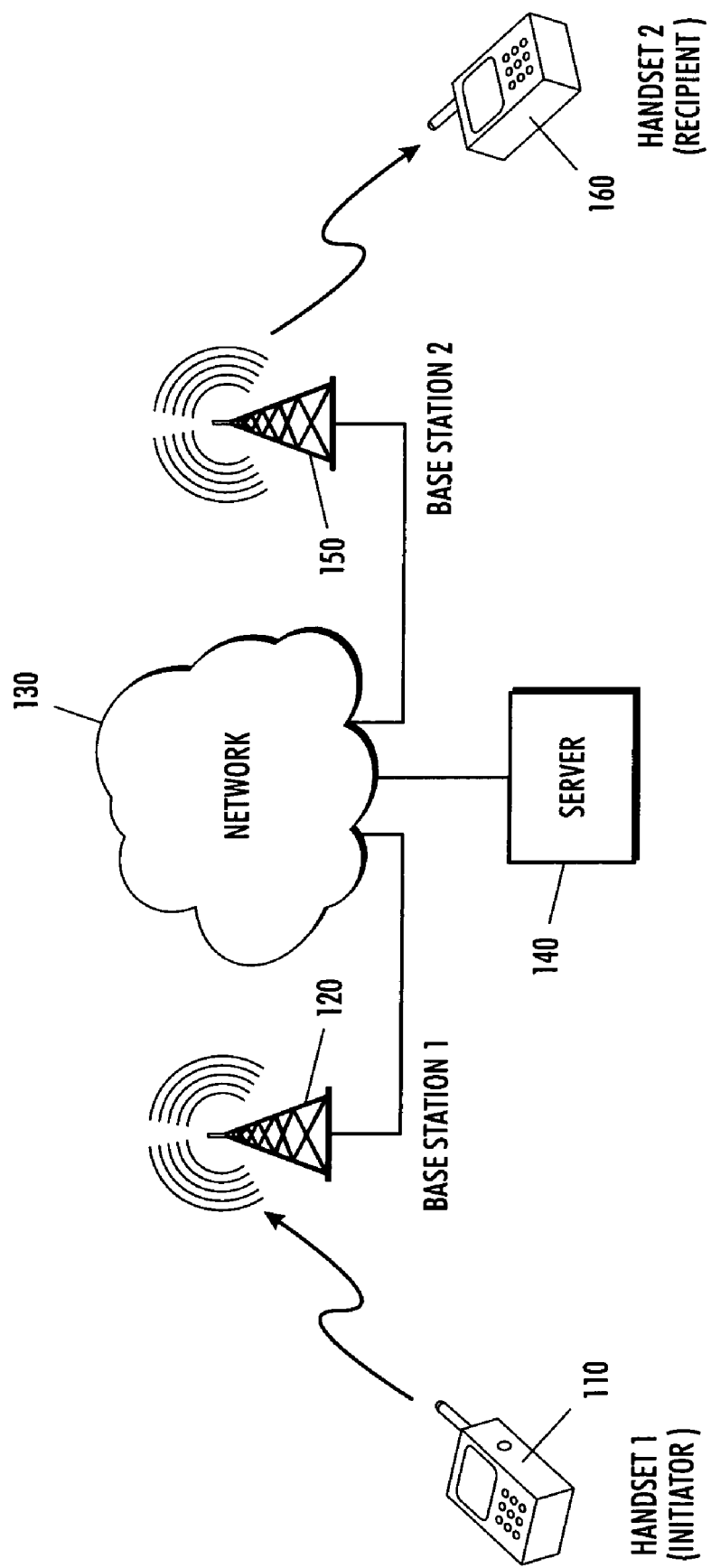
FIG. 1 illustrates an example centralized cellular network utilizing the voice messaging system.

The voice messaging communication system and method described herein provide a message-recording facility integrated with a lightweight audio communication facility. During or after the initiator's initial turn, the system assesses the recipient's state and whether the message will be passed through the lightweight audio channel. If the initiator's message is not passed through the audio channel, an audio message from the recipient may be played to the initiator in the same manner as a normal reply message would be. If the initiator chooses to reply, the reply will be recorded for later retrieval by the recipient. All of this occurs in the standard user interface used by the lightweight audio communication system.

From the standpoint of conversational structure, a key difference between the three-turn model (I-R-I, initiator-recipient-initiator) disclosed herein and the two-turn model (summons-R-I) of a telephone answering machine is the potential for a single, continued trajectory of action. With a telephone call, the initiator dials and issues the summons (ringing); the response may either be for (1) the recipient to pick up, (2) an answering machine to pick up, or (3) the ringing to continue indefinitely. The call initiator does not actually initiate a sequence of turns at talk, but is instead waiting for the recipient to initiate turn-taking. In addition, the call initiator does not know definitively what type of action will have to be taken next (greet the recipient, leave a message, or hang up, respectively). The initiator may be said to be blocked, waiting synchronously for something to happen (or not happen) on the recipient's side before conversational turn-taking can begin.

It should be noted here that this blocking problem—of being unable to determine what one's next type of conversational action will be, but knowing that an action will be needed immediately after a conversational response is received—is specific to synchronous, real-time mediated communication systems such as telephony or push-to-talk audio. It does not arise in textually-oriented mediated communication systems such as electronic mail, instant messaging or mobile text messaging because such systems do not involve the production of spoken turns-at-talk.

By contrast, in the three-turn model, the initiator begins a sequence of turns-at-talk. In current half-duplex, PTT interaction, there would be a short period of expectancy, waiting for a reply from the recipient. Here, a state assessment is performed during an expectancy period to determine availability of the recipient. This would be followed by either a reply from the recipient or the recorded reply. The recorded reply falls into an expected "slot" for the recipient's talk. The initiator's subsequent reply, if any, also falls into a "slot" that the initiator would already be expecting to fill—although the recipient's recorded reply may not be the response that the initiator was expecting, it is nevertheless true that (in contrast with the answering machine case) the initiator is engaged in turn-taking. The initiator has the opportunity to still "go," as opposed to being blocked.

The overall advantage, then, goes somewhat deeper than providing a "more natural" or "more integrated" interface. By staying within the framing of conversational turn-taking in the lightweight audio communication system, one avoids user interface context switching (e.g., to a separate voicemail system) and attention-demanding user interface interactions (e.g., synchronous operations in a separate voicemail system) as well as making the overall experience more integrated.

In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the present invention. Referring to FIG. 1, the schematic diagram illustrates an example embodiment of the system for voice messaging employing a three-turn interaction design. Communication is initiated and received through handsets 110 and 160. Handsets 110 and 160 may be, for example, general-purpose portable computers augmented with wireless communication hardware (a "smart phone") or mobile telephones that include an embedded processor capable of running the software described herein. It is noted that handset-1 (110) and handset-2 (160) may typically run very similar software and are distinguished herein because in any given connection attempt, one handset acts as the initiator (handset-1) and the other handset acts as the recipient (handset-2).

Audio data transmitted between handsets 110 and 160 as well as the signaling data required to initiate, maintain and tear down voice communication sessions between handsets 110 and 160 are carried over communication network 130. Communication network 130 may involve, for example, conventional switched telephone network hardware or Internet Protocol (IP) networks capable of carrying audio data. If handsets 110 and 160 are mobile, as shown in FIG. 1, they will communicate wirelessly with respective wireless base stations 120 and 150. Communication between handsets 110 and 160 and respective base stations 120 and 150 may involve protocols employed on conventional mobile telephone networks, such as those based on the GSM 900/1800/1900 standards defined by the Groupe Spéciale Mobile (GSM) Association, or protocols employed on wireless data networks, such as those based on the 802.11b (WiFi) or 802.16-2004 (WiMAX) standards defined by the Institute of Electrical and Electronics Engineers (IEEE). Where audio data is transmitted using Voice over IP (VoIP), audio data may be transported using open protocols such as the Internet Engineering Task Force (IETF) Real-time Transport Protocol (RTP).

Server 140 may be a general-purpose computer upon which reside the software modules capable of managing system operation. It may also be a system designed specifically for telephone network switching into which such software modules have been incorporated. Where a specific coding/decoding algorithm (codec) used to represent audio data is not pre-determined by the communication network (as when audio data is carried over a GSM audio channel), other known codecs can be used. There are many standard codecs, such as those described in International Telecommunications Union (ITU) Recommendation G.711 (Pulse Code Modulation (PCM) of Voice Frequencies), but the use of non-standard codecs such as the conversion of audio to text on the sending handset (using known automatic speech recognition techniques) and from text to audio (using known speech synthesis techniques) on the receiving handset is also contemplated. Further, codecs and protocols can vary within a system. In one embodiment, audio data is coded using the GSM codec on handset 110 and transmitted over a GSM audio channel to base station 120, transcoded to G.711 by base station 120 and transmitted to server 140, decoded from G.711 by server 140 and finally processed; a reply message encoded as plain text is produced on server 140, transmitted as IP packets to the handset 110, and decoded to audio using speech synthesis.

Various computing environments may incorporate capabilities for providing voice messaging capability employing a three-turn interaction design. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Figure 2:
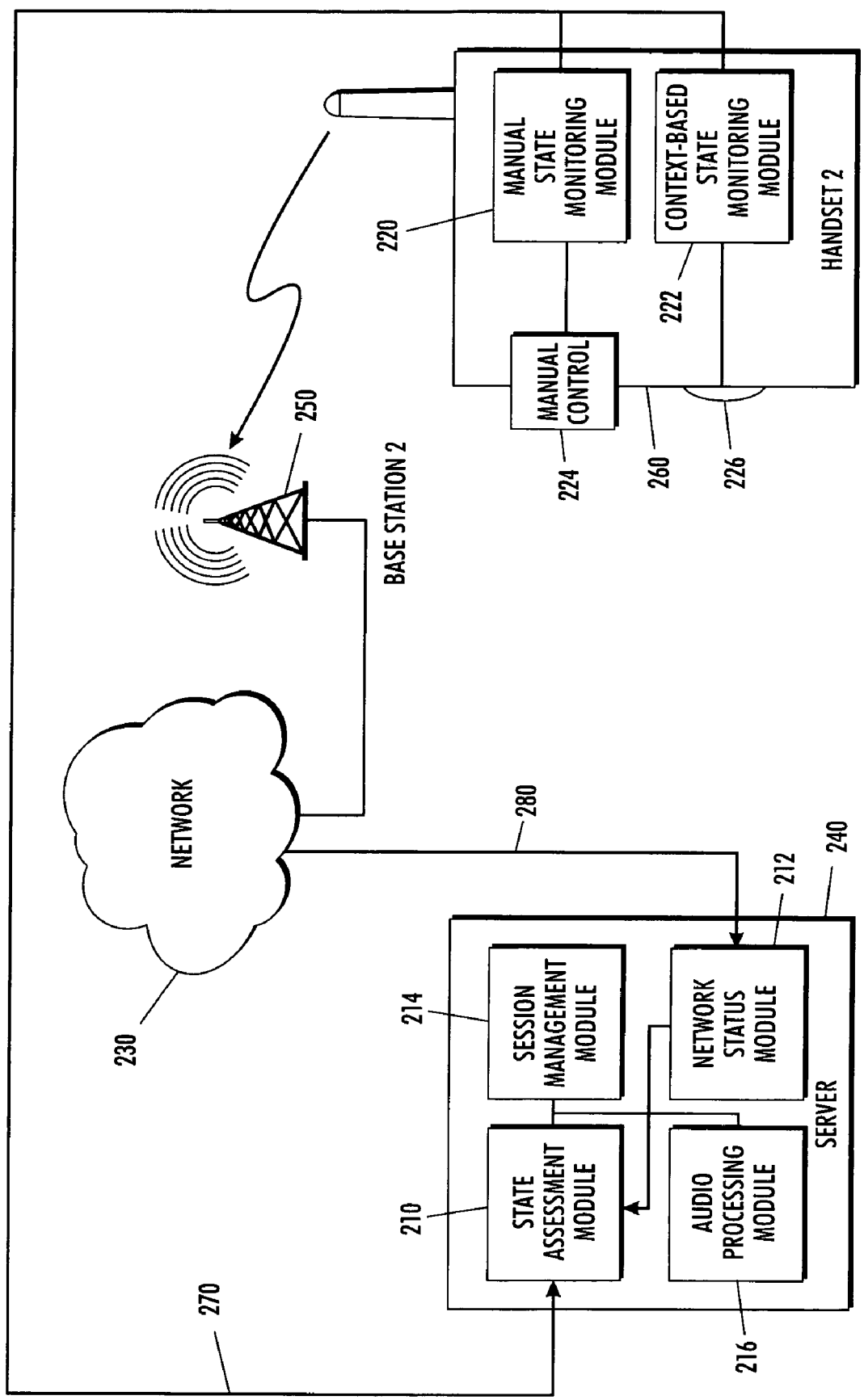
FIG. 2 illustrates one embodiment of the voice messaging system in a centralized cellular network.

Turning now to FIG. 2, there are illustrated software elements of the network architecture depicted in FIG. 1. For descriptive purposes, the software elements of the system that is partially depicted in FIG. 2 are divided by execution location into four software modules that execute on the server 240 and two software modules that execute on each handset 260. For the purpose of this discussion, server 240 and handset 260 are described as being general-purpose computers. However, it is noted that server 240 and handset 260 may take the form of any of the computing environments described above, augmented with appropriate communication network equipment.

For descriptive purposes, the software modules executing on server 240 and handset 260 may be grouped into two main functional categories. The first category consists of the modules whose main function is to implement audio communication. The basic functionality of these modules may be similar to that found in conventional voice communication systems, such as cellular telephone systems. These modules are the session management module 214 and audio processing module 216. The second category consists of the modules whose main function is to implement and support the control logic for the three-turn interaction system disclosed herein. These modules include the network status module 212, the manual state monitoring module 220, the context-based state monitoring module 222, and the state assessment module 210. We will refer to these two categories as the "audio communication" and "control logic" modules, respectively.

The first "audio communication" module, session management module 214, performs functions of communications session establishment, modification and termination in accordance with common industry definitions such as those found in IETF Request for Comments (RFC) 3261. As such, it may consist of software that interfaces with conventional switched telephony hardware to establish, modify and terminate sessions. Alternatively, it may consist in part of VoIP session management software implementing open protocols such as the International Telecommunications Union (ITU) H.323 protocol or the IETF Session Initiation Protocol (SIP).

The second "audio communication" module, audio processing module 216, provides a number of functions related to the storage, retrieval and network transmission of audio streams, mainly under the direction of the session management module 214. As previously discussed, audio data in an audio stream may have one of a number of representations depending on the codec or codecs in use and the processing steps that must be undertaken next. Audio processing module 216 implements the storage and retrieval of audio messages that are pre-recorded by subscribers for later automatic playback by the system. (This is analogous to the functionality required for voice greeting messages in conventional voicemail systems.) Audio processing module 216 also provides the capability to store and retrieve audio communication streams transmitted over the network 270 and destined for handset 260. This enables later automatic playback by the system.

Three of the "control logic" modules serve primarily to collect various kinds of input data and pass the input data to the fourth "control logic" module. The first "control logic" module, network status module 212, receives network status data 280 from network 230. An example of such network status data would be whether handset 260 is currently associated with a base station and therefore available to accept network connections. The second "control logic" module, manual state monitoring module 220, monitors a manual control input device 224 built into the handset 260. An example of one such manual control input device 224 is a pushbutton switch, but any other manual control input device known in the art could also be utilized. The third "control logic" module, context-based state monitoring module 222, monitors a context sensor 226 built into the handset 260. An example of one such context sensor is a microphone capable of measuring ambient sound levels, but other context sensors known in the art are also contemplated by the specification and scope of the claims herein.

The fourth "control logic" module, state assessment module 210, receives state assessment data such as data from network status module 212 executing on server 240 and from the manual state monitoring module 220 and context-based state monitoring module 222 executing on handset 260 and stores the data locally. State assessment module 210 uses this state assessment data to determine the current readiness of the user of handset 260 to accept incoming communication requests and, consequently, how to handle these requests.

The following is an example of the handling of incoming communication requests by state assessment module 210, based on input from network status module 212. Since active cellular phones are usually associated with a current base station, even if a call is not in progress, the network can assess that a phone is not "on the air" and handle a call Oust as telephone calls can be sent to voicemail or Direct Connect calls can get a "not available" beep). Here, the system plays a message indicating that the recipient's phone can't be reached. The initiator, realizing that the recipient won't be interrupted by receipt of a message, chooses to do so. Being unsure when the recipient will turn on his phone (or notice that his phone is off), a time-bounded message may be left:

EXAMPLE 5

Recipient has Telephone turned off (same Scenario as Example 2)

1. Initiator: (pushes PTT) (receives go-ahead "beep") "Can you come here?"
2. Recipient: (automated message) "Sorry, my phone is off."
3. Initiator: (2-second pause) (pushes PTT) "If you get this before five today, I need help with the quarterly report."

Here, the initiator's first PTT request is routed to server 240 and received by session management module 214, which requests a determination from state assessment module 210 as to how to handle the incoming request. State assessment module 210 has received network status information from network 230 via network status module 212 that indicates that the recipient's handset 260 is not currently associated with a base station (since it is turned off). State assessment module 210 communicates this information to session management module 214, which takes two main steps to handle the initiator's request. First, it directs audio processing module 216 to transmit the recipient's pre-recorded message to the initiator. Second, it waits for a fixed length of time for a new PTT request to arrive from handset 260. If a request arrives (as it does here), session management module 214 directs the audio stream to audio processing module 216. Audio processing module 216 stores the recorded audio stream for later retrieval by the user of handset 260.

In a second example, state assessment module 210 may handle incoming communication requests based on input from manual state monitoring module 220. Here, the recipient is busy and quickly hits a hardware button 224 indicating that he is busy. The system plays a message indicating this state. The initiator, after thinking for a few seconds, decides that she is not familiar enough with the recipient's current work schedule to know when he will be available and leaves a non-urgent message:

EXAMPLE 6

Recipient does not Wish to Reply (same Scenario as Example 3)

1. Initiator: (pushes PTT) (receives go-ahead "beep") "Can you come here?"
2. Recipient: (pushes "busy button") (automated message plays) "Sorry, I'm in the middle of something."

3. Initiator: (7-second pause) (pushes PTT) "When you get a chance, I need help with the quarterly report."

Here, the initiator's first PTT request is routed to server 240 and received by session management module 214, which requests a determination from state assessment module 210 as to how to handle the incoming request. State assessment module 210 has received network status information from network 230 via network status module 212 that indicates that the recipient's handset 260 is currently associated with a base station 250 (since it is turned on). State assessment module 210 communicates this information to session management module 214, which directs audio processing module 216 to forward the audio corresponding to the initiator's PTT request to handset 260, where the audio is played. Normally, session management module 214 would then wait for subsequent PTT requests from either the initiator or the recipient. However, what happens instead is that the recipient pushes manual control 224, which causes manual state data to be transmitted over network 230 and received by state assessment module 210. State assessment module 210 communicates this information to session management module 214, which takes two main steps in response. First, it directs audio processing module 216 to produce the recipient's pre-recorded response message from internal storage and play this response message back to the initiator. Second, it waits for a fixed length of time for a new PTT request to arrive from handset 260. If a request arrives (as it does here), session management module 214 directs the audio stream to audio processing module 216. Audio processing module 216 stores the recorded audio stream for later retrieval by the user of handset 260.

In another example, state assessment module 210 may handle incoming communication requests based on input from context-based state monitoring module 222. In this case, on-board sensor 226 on the recipient's handset 260 detects a high ambient noise level at the construction site and assesses that the recipient is unlikely to hear the initiator's message. Here, the system performs an action similar to that taken when the handset 260 is turned off:

EXAMPLE 7

Recipient is in a Loud Environment (same Scenario as Example 4)

1. Initiator: (pushes PTT) (receives go-ahead "beep") "Can you come here?"
2. Recipient: (automated message plays) "Sorry, it's loud here."
3. Initiator: (pushes PTT) "I need help with the quarterly report."

Here, the initiator's first PTT request is routed to server 240 and received by session management module 214, which requests a determination from state assessment module 210 as to how to handle the incoming request. State assessment module 210 has received network status information from network 230 via network status module 212 that indicates that the recipient's handset 260 is currently associated with a base station 250 (since it is turned on). However, context-based state monitoring module 222 has been monitoring the output of sensor 226 on handset 260 and has transmitted this data to state assessment module 210. State assessment module 210 communicates this information to session management module 214, which takes the same steps as when the handset 260 was turned off.

It is noted that not all of these state monitoring modules may be implemented in all variants of the voice messaging system. Additionally, the full set of state monitoring modules implemented by a variant of the voice messaging system may not be utilized at all times (as when a context sensor is allowed to be switched off). The different state monitoring modules also may be combined in a variety of ways, both in terms of which procedures are utilized and the order in which they are utilized in making state assessments. The state monitoring modules described above are merely representative of the state monitoring modules that are contemplated, and that other variations, alternatives, modifications, improvements, equivalents, and substantial equivalents of the modules described herein are fully contemplated by the specification and scope of the claims. Similarly, input modalities and data types other than those just described may be associated with network status module 212, manual state monitoring module 220, and context-based state monitoring module 226.

Network status module 212 can usefully monitor a variety of network performance and reliability statistics, not just the handset connectivity status described with relation to Example 4. Examples of useful network status data include the current wireless packet loss rate between base station 250 (with which handset 260 is known to be associated) and its associated handsets, or the current packet loss rate, latency and throughput between base station 250 and server 240 over network 230. All of these can be used as input to a decision as to whether or not the overall system can effectively transmit audio data over network 230 to handset 260 (that is, whether handset 260 is "off the air" for the purposes of practical audio communication, even if it is still nominally reachable through network 230).

Manual state monitoring module 220 can usefully monitor a variety of manual control inputs 224, and is not limited to only the hardware pushbutton switch described with relation to Example 5. Examples of useful input modalities include tactile controls (such as pushbuttons, switches, soft keys, etc.), motion-sensing devices (such as accelerometers, magnetic field sensors, etc.), and audio processing software (such as speech recognition or wordspotting for commands, e.g., "Busy!").

Context-based state monitoring module 226 can usefully monitor any of a variety of context sources, not just the microphone described with relation to Example 6. Many context sources (not all of which may be termed "sensors" in the usual meaning) have been described in the literature and may be utilized. Some example context sources include proximity sensors, location sensors, and environment sensors.

In the case of proximity sensors, an example state assessment inference that may be made is that the recipient wishes not to be contacted if the handset is distant from their body. Typical proximity sensors may include an RFID (Radio-Frequency IDentification) reader built into the handset. The RFID reader assesses the handset's distance from a known RFID tag worn on the body (e.g., embedded in a phone holster, attached to a wristwatch, attached to a charm bracelet). Since most readers do not measure signal strength, the proximity test can be based on whether the known RFID tag can be read or not. Alternatively, a Bluetooth® transceiver built into the handset assesses the handset's distance from another Bluetooth transceiver worn on the body (e.g., a Bluetooth earphone, or a Bluetooth-enabled wristwatch). Again, if the handset transceiver does not expose an API (Application Program Interface) that enables signal strength readings to be read, the proximity test can be based on whether the worn transceiver is reachable. Many other known technologies could potentially be used, such as touch-sensitive flexible pads, so-called "bodynet" transceivers, or sensors that detect interruptions/perturbations in an electric field caused by the human body (as used in some touch-sensitive screens and car seat airbag controllers), all of which are contemplated by this specification and the scope of the claims herein.

In the case of location sensors, an example state assessment inference that may be made is that the user wishes not to be contacted or wishes to invite contact if the handset can be determined to be in certain locations. For example, a user may wish to always be available for communication at their workplace, but never available for contact at their home. Typical location sensors may include various types of positioning technologies, such as those based on proximity to beacons at known physical locations (as in the Bluetooth examples above), electromagnetic signal strength (e.g., infrastructure-based wireless LAN positioning, cellular network tower triangulation), and those based on signal timing (e.g., GPS).

In the case of environment sensors, an example state assessment inference is that the recipient wishes not to be contact if the handset can be determined to be in a dark place. A variety of light-intensity sensors may be utilized, such as photoresistors, photovoltaic cells, photodiodes or charge-coupled devices (CCDs).

The following is provided as a scenario in which these additional context sources would be useful. Here, the initiator and recipient have been collaborating on a project, working at opposite ends of an office building. The initiator attempts to contact the recipient, who is using the restroom. Location sensor data allows the context-based state monitoring module 226 to notify the state assessment module 210 that the recipient is temporarily unavailable for communication:

EXAMPLE 8

Recipient is in the Restroom (similar to Example 4)

1. Initiator: (pushes PTT) (receives go-ahead "beep"), "Let's break for lunch."
2. Recipient: (automated message plays) "Sorry, I'm momentarily unavailable."
3. Initiator: (pushes PTT) "Meet me in the cafeteria. I'm going to lunch now."

Operation of the system is otherwise much like that described for Example 7.

Additional embodiments of the voice messaging system disclosed here are possible based on modification of the functionality of the audio processing module 216. For example, contemplated embodiments can vary the method by which response messages are produced by the audio processing module 216. Response messages for various states may be fully pre-recorded; partially pre-recorded (augmented with synthesized speech or non-speech audio); or artificially generated (made up entirely of synthesized speech or non-speech audio). Alternatively, contemplated embodiments can vary the ways in which the initiator may be given the opportunity to use their initial turn as part of their third-turn recording. A first variation is that the initiator may be allowed to record only within the normal notion of a single call. In the Nextel unit, a Direct Connect session times out after 8 seconds and a new session must be reinitiated using the address book or the "last person I talked to" button. This requires the initiator to decide on a message very quickly or else lose the opportunity, which is not always desirable. Hence, a second variation is that the initiator may also be given a way to record a response after the session times out. For example, if the initiator reinitiates and the state has not changed, they may immediately obtain the recipient's message and be left in the recording mode. Alternatively, a special hardware button or address book soft key may be used to return to the recording mode.

Figure 3:
FIG. 3 illustrates peer-to-peer communication utilizing the voice messaging system without a central network.

FIGS. 1 and 2 depicted one network architecture contemplated in this disclosure, but additional network architectures contemplated herein may not require a central network 230 or distinct server 240. One such architecture is achieved when the handsets communicate in a peer-to-peer manner, illustrated in FIG. 3. This mode of operation may be a direct radio connection or it may include a mesh network of cooperating network nodes. In such cases, functionality equivalent to that described with reference to FIG. 2 for server 240 and handset 260 is implemented by software running on one or more of the handsets 310 and 320. Various handsets may execute a fraction of the functionality (i.e., the total functionality may be split, with the handsets executing their parts cooperatively) or one handset may execute all of the functionality of server 240. It is noted that similar splitting of functionality may occur in an architecture similar to that illustrated in FIG. 1.

Figure 4:
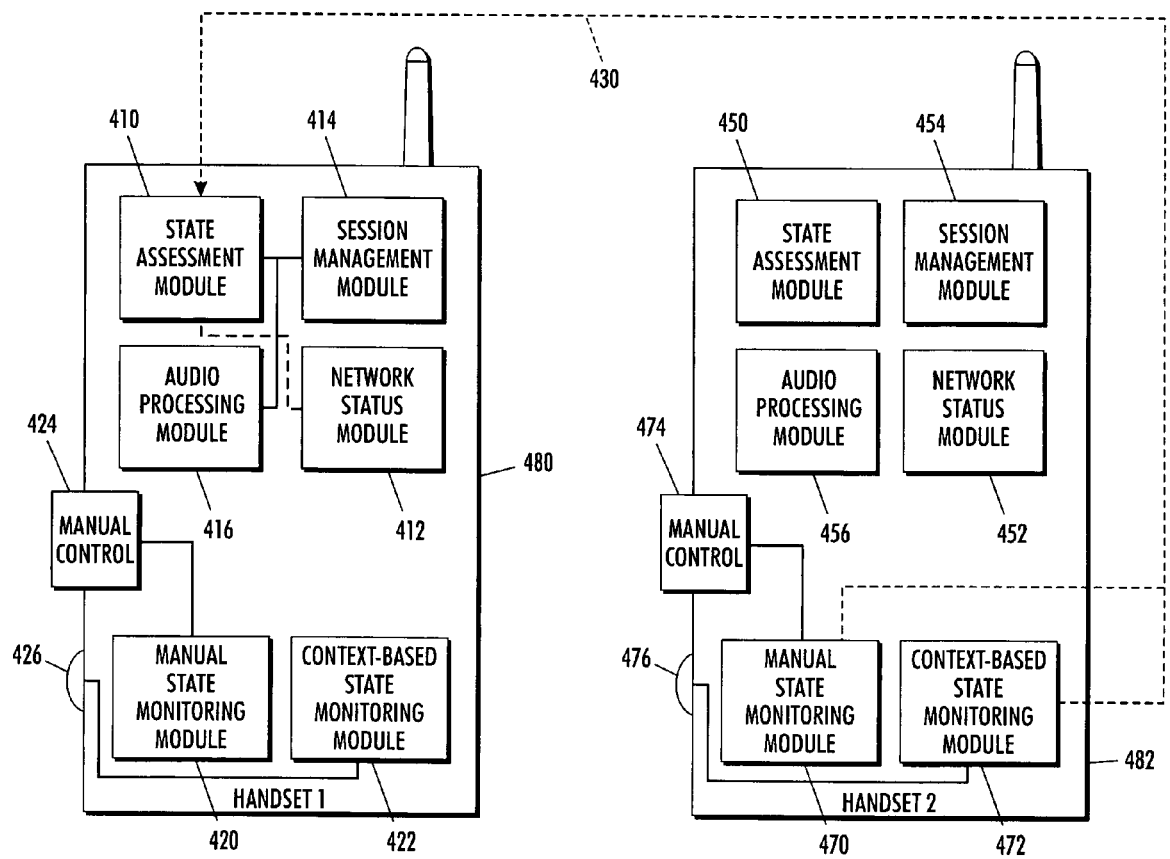
FIG. 4 illustrates an embodiment of the voice messaging system for peer-to-peer communication.
Figure 5:
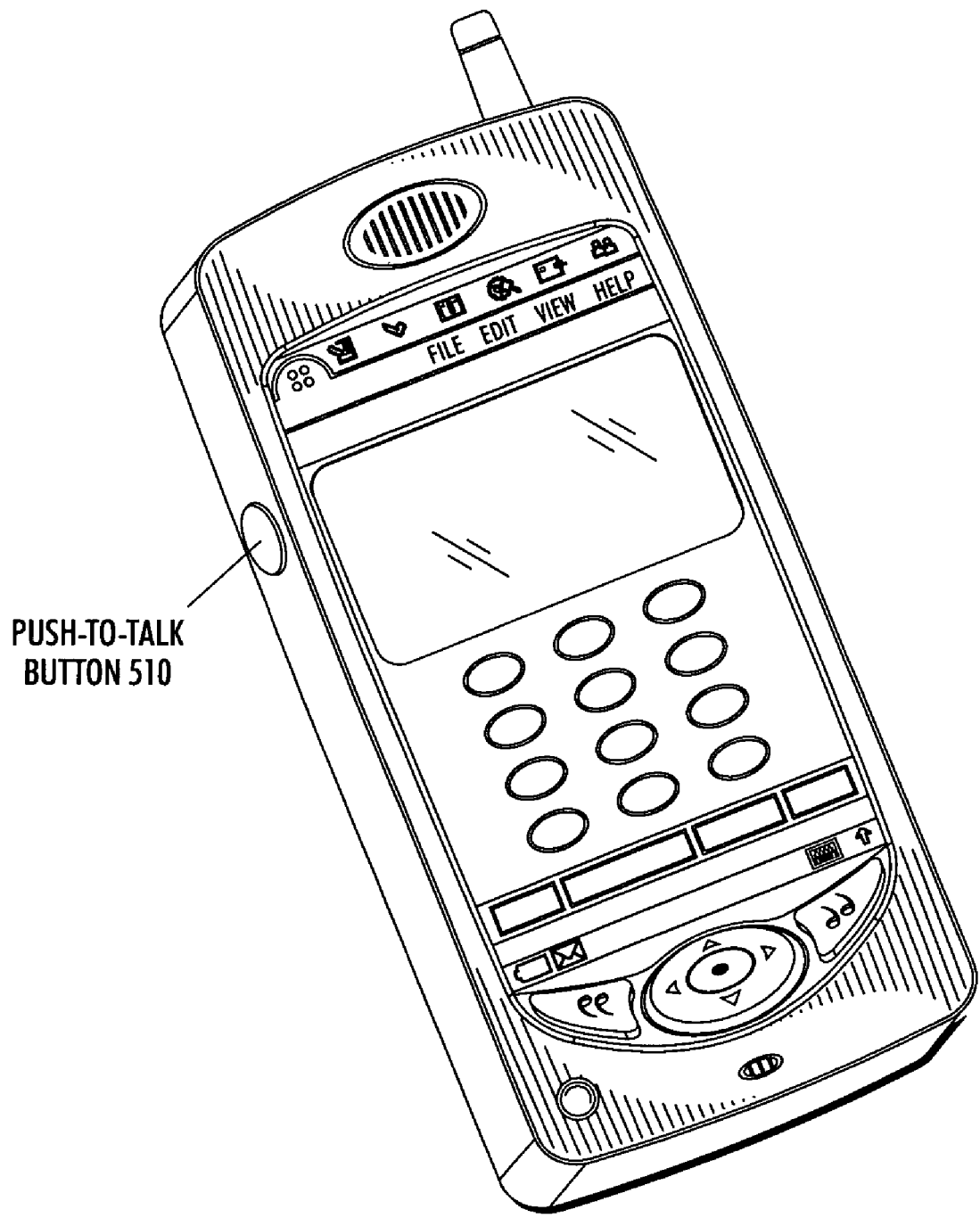
FIG. 5 illustrates one example of a push-to-talk handset.

FIG. 4 partially illustrates the software elements of the peer-to-peer architecture. In this architecture, both handset-1 (480) and handset-2 (482) include state assessment modules 410 and 450, session management modules 414 and 454, audio processing modules 416 and 456, network status modules 412 and 452, manual state monitoring modules 420 and 470 and associated manual controls 424 and 474, context-based state monitoring modules 422 and 472 and associated context sensors 426 and 476, each of which performs some or all of the functions described with respect to FIG. 2 for the corresponding modules. That is, in cases where the user of handset-1 (480) is the initiator and the user of handset-2 (482) is the recipient, modules 414 and 416 serve as the "audio communication" modules and modules 412, 470, 472 and 410 serve as the "control logic" modules. While FIG. 4 illustrates the case in which communication flows from Handset 1 to Handset 2, communication necessarily flows in the reverse direction as well and functionality discussed with reference to one of the handsets is applied to all communicating handsets.

Figure 6:
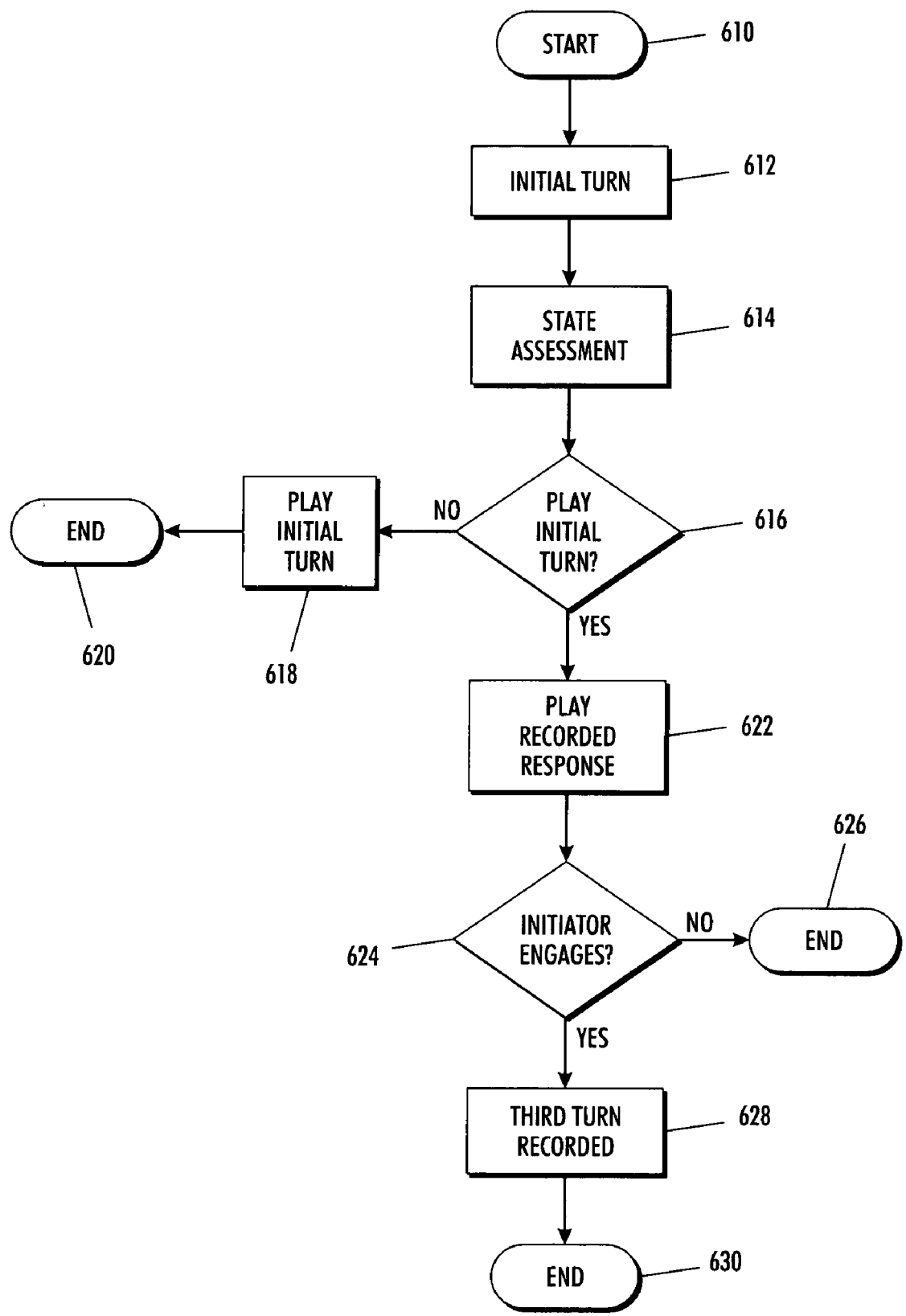
FIG. 6 is a flowchart illustrating an example embodiment of the method for operating the voice messaging system.

Turning now to FIG. 6, a flowchart illustrates an example embodiment of the method for operating a three-turn interaction design voice messaging system. For clarity, the flowchart will be explained in the context of Example 3 operating in the network architecture depicted in FIG. 2. At 610 the procedure is initiated when the initiator pushes the PTT function button on the initiator's handset. At the end of 610, the initial PTT request has been received and acknowledged by the session management module executing on the server and the initiator's handset has played a "go-ahead" beep. During the initial turn at 612 the initiator begins a first turn at talk, such as, for example, "Are you available?" At the end of 612, the audio processing module executing on the server has been directed by the session management module to begin buffering the audio stream that contains the first turn being transmitted from the initiator's handset. At 614, the state assessment module executing on the server retrieves the current network state of the recipient's handset from the network status module, resulting in an assessment of the recipient's state. At 616 this assessment is used to decide whether the message will be passed through the lightweight audio channel or recorded for later retrieval. That is, if the assessment at 616 is that the recipient's handset is on the network and capable of receiving the audio stream corresponding to the initiator's first turn, the audio stream is transmitted by the audio processing module to the recipient's handset at 618 (for playback at the recipient's handset) and the procedure ends at 620.

However, if the assessment at 616 is that the recipient's handset is not capable of receiving the audio stream, at 622 a recorded response is transmitted from the audio processing module to the initiator's handset as a second turn by the audio processing module. Recorded responses can take any number of forms depending on the user's needs and the result of the state assessment, e.g., "I'm momentarily unable to answer," "There's a network problem, please leave a message," etc. As previously mentioned, the content of the recorded response can also be partly or wholly generated by the system. Once the recorded response has been transmitted to the initiator's handset for playback, the session management module waits for a specified period of time (such as the 8 second session timeout period used by Nextel phones) for a response from the initiator. A determination is made at 624 as to whether the initiator is engaging, that is, opting to reply to the recipient's recorded response message. One indicator of such responsive engagement is when the initiator presses the PTT function button on the initiator's handset. If the initiator does not reply within the specified period of time, the procedure ends at 626. If the initiator does reply, the session management module causes the audio processing module to record the initiator's third turn at 628 and the procedure ends at 630.

FIG. 6 provides a high-level view of the overall system operation. Similar descriptions using essentially the same flowchart can be applied to the system operation using different embodiments. For example, a substantially similar flowchart can be applied in embodiments where alternative state monitoring modules are used; where different input modalities are used for respective state monitoring modules; where different network architectures are used as illustrated in FIG. 4; and in the various other embodiments that have been disclosed above.

Figure 7:
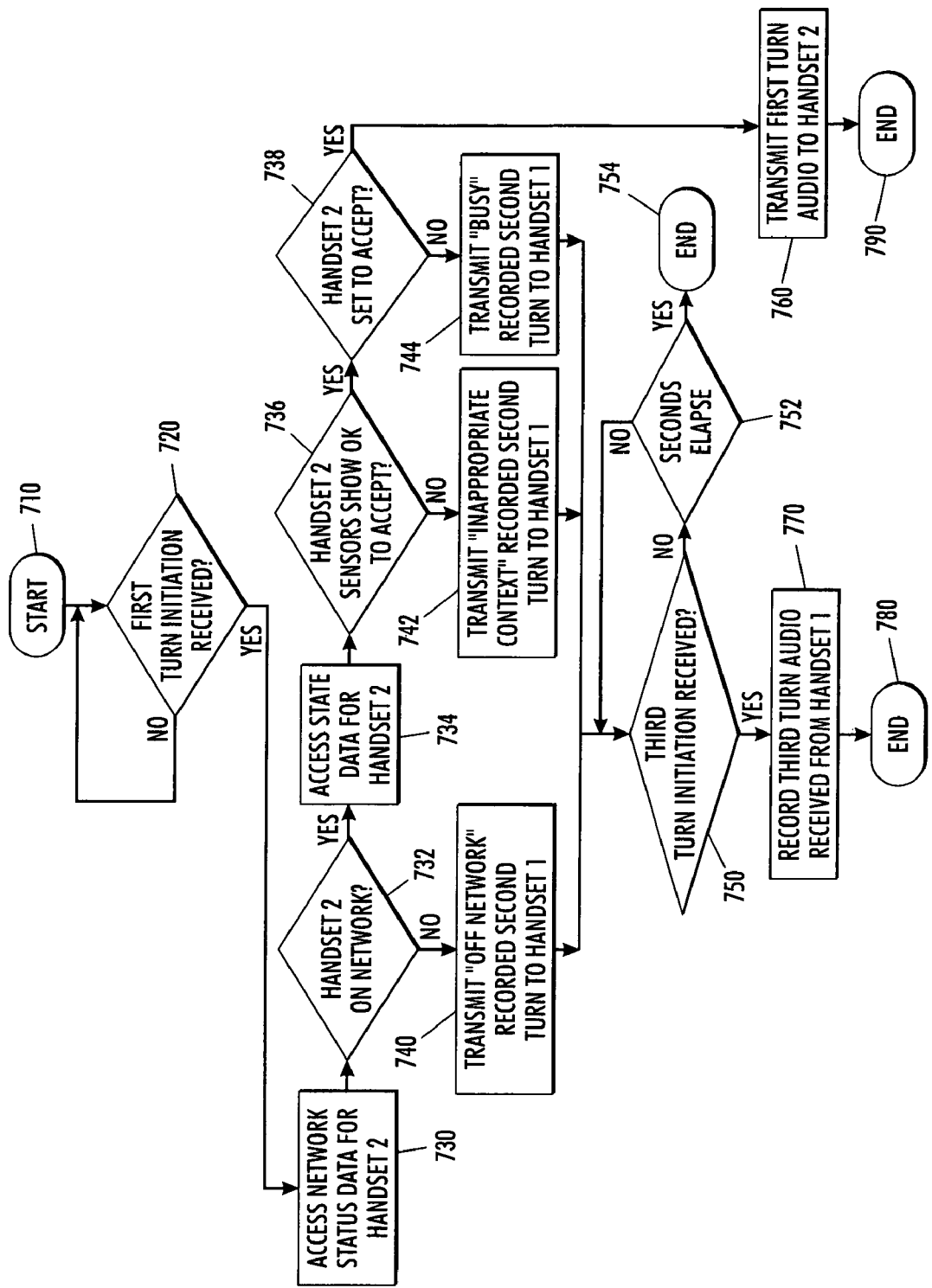
FIG. 7 is a flowchart illustrating an example embodiment of the method for operating the voice messaging system within the centralized cellular network.

Turning now to FIG. 7, a flowchart illustrates another example embodiment of the method for operating a three-turn interaction design voice messaging system, in which different messages as played in response to different causes for session establishment failure are encountered. For clarity, the flowchart will be explained in the context of the network architecture depicted in FIG. 2. At 710 the procedure is initiated. At 720, the system loops, waiting for the initiator to initiate a first turn by pushing the PTT function button on the initiator's handset. At the end of 720, the initial PTT request has been received and acknowledged by the session management module executing on the server and the initiator's handset has played a "go-ahead" beep. During the initial turn at 720, the initiator begins a first turn at talk, such as, for example, "Let's break for lunch"; the audio processing module executing on the server directs the session management module to begin buffering the audio stream that contains the first turn being transmitted from the initiator's handset. The procedure continues to 730, where the state assessment module executing on the server retrieves the current network state of the recipient's handset from the network status module, resulting in an assessment of the recipient's state.

At 732 this assessment is used to decide whether the message will be passed through the lightweight audio channel or recorded for later retrieval. That is, if the assessment at 732 is that the recipient's handset is on the network and capable of receiving the audio stream corresponding to the initiator's first turn, the procedure continues to 734. However, if the assessment at 732 is that the recipient's handset is not capable of receiving the audio stream, at 740 a recorded response is transmitted from the audio processing module to the initiator's handset as a second turn. This response is tailored to the off-network situation (as in Example 5: "Sorry, my phone is off") and, as previously mentioned, the content of the recorded response can also be partly or wholly generated by the system. This response is played back for the initiator by the initiator's handset and the procedure continues to 750.

At 734 the state assessment module executing on the server retrieves the manual state monitoring data for the recipient's handset from the manual state monitoring module and the context-based state monitoring data for the recipient's handset from the context-based state monitoring module, respectively, resulting in respective assessments of the recipient's state. In some embodiments, both sets of state monitoring data will be retrieved immediately from data stored on the server, having been previously transmitted from the recipient's handset and then cached. In other embodiments, such as that previously described in Example 6, the state assessment module may wait for an acknowledgement message from the recipient's handset that indicates that the audio stream from the initiator's first turn has been played. This is to enable the recipient to activate their manual control in reaction to the first turn, causing an update to the manual state monitoring data to be transmitted from the recipient handset to the manual state monitoring module on the server.

At 736 the assessment based on the context-based state monitoring data is used to decide whether the message will be passed through the lightweight audio channel or recorded for later retrieval. That is, if the assessment at 736 is that the recipient's handset is in a situational context such that it will be acceptable to play the audio stream corresponding to the initiator's initial turn, the procedure continues to 738. However, if the initial turn is not to be accepted at this time, at 742 a recorded response is transmitted from the audio processing module to the initiator's handset as a second turn. This response is tailored to the inappropriate-context situation (as in Example 7: "Sorry, it's loud here," or as in Example 8: "Sorry, I'm momentarily unavailable"), and as previously mentioned, the content of the recorded response can also be partly or wholly generated by the system. This response is played back for the initiator by the initiator's handset and the procedure continues to 750.

At 738 the assessment based on the manual state monitoring data is used to decide whether the message will be passed through the lightweight audio channel or recorded for later retrieval. That is, if the assessment at 738 is that the recipient's handset is in a manually-controlled state such that it will be acceptable to play the audio stream corresponding to the initiator's initial turn, the procedure continues to 760. However, if the initial turn is not to be accepted at this time, at 744 a recorded response is transmitted from the audio processing module to the initiator's handset as a second turn. This response is tailored to the busy situation (as in Example 6: "Sorry, I'm in the middle of something") and, as previously mentioned, the content of the recorded response can also be partly or wholly generated by the system. This response is played back for the initiator by the initiator's handset and the procedure continues to 750.

At 760, the audio stream containing the initiator's first turn is transmitted to the recipient's handset (unless, as in some embodiments, this has already been completed in 734) and the procedure ends at 790 with the likelihood that the users will have a normal PTT interaction. Optionally, the remainder of the first turn audio may be received and discarded prior to the operation at 740, 742, or 744, or this information may be recorded for inclusion in the third turn message left by the initiator at 770.

At 750 one of several possible recorded responses has been transmitted to the initiator's handset for playback and the session management module waits for a specified period of time (such as the 8 second session timeout period used by Nextel phones) for a response from the initiator in the form of a third turn initiation. Third turn initiation occurs if the initiator pushes the PTT function on the initiator's handset. If a third turn message is received within the specified period of time, the session management module causes the audio processing module to record the audio stream corresponding to the initiator's third turn at 770 and the procedure ends at 780. In another embodiment, the system allows the initiator to retrieve the recorded initial turn and incorporate the audio into the third turn message. If the initiator does not reply within the specified period of time, the procedure ends at 754.

Figure 8:
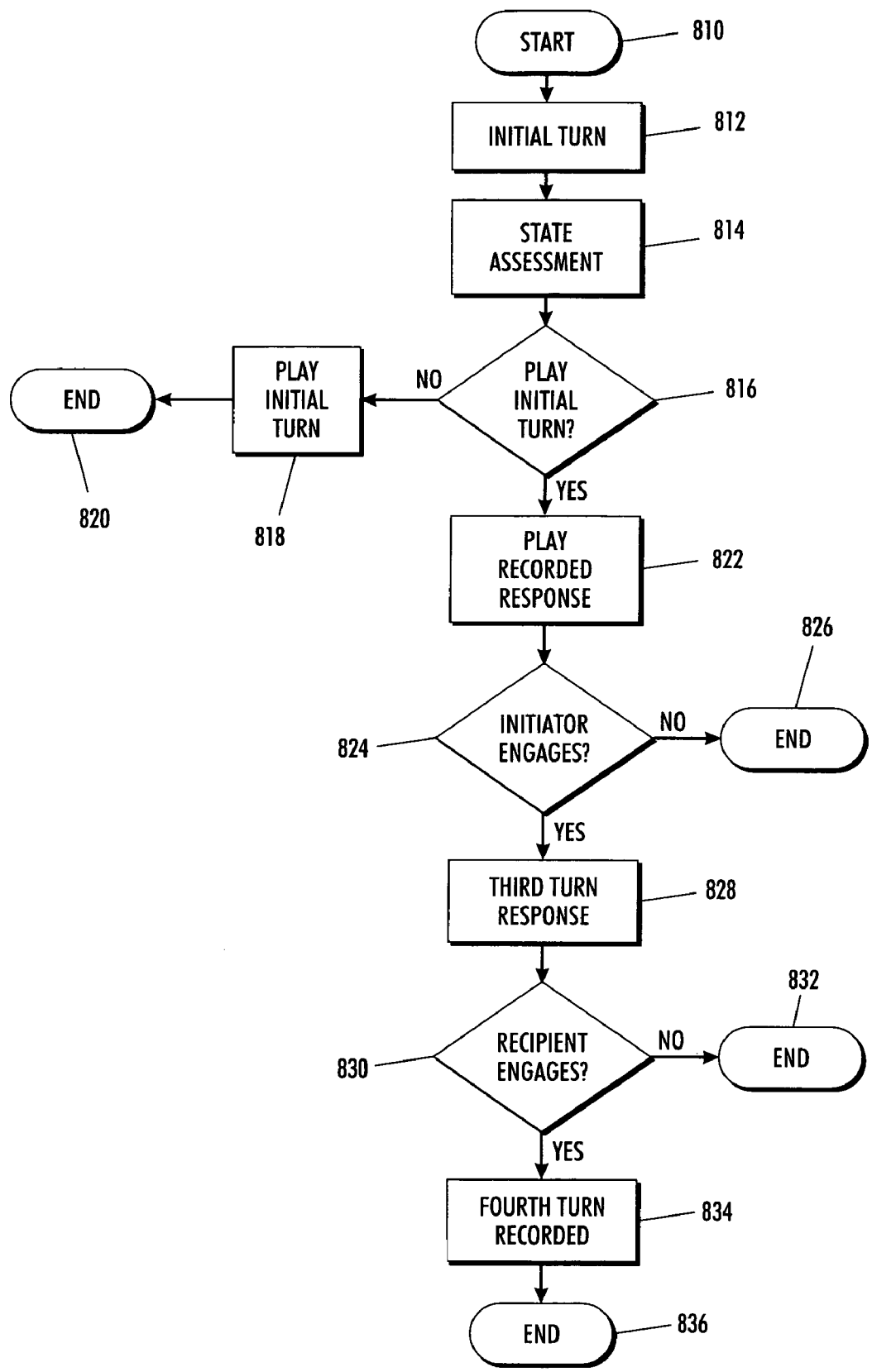
FIG. 8 is a flowchart illustrating another example embodiment of the method for operating the voice messaging system.

The basic three-turn model disclosed herein may be extended to subsequent turns. When the recipient reviews their messages, the initiator's recorded reply can be delivered in the same manner as an incoming message would be delivered. In half-duplex, PTT operation, this might mean that the recipient could simply push the PTT button and reply immediately to the third turn. Again, unlike voicemail system interactions, the user does not deal with the synchronous interface of an external message storage system ("Press 7 to reply to this message"), but instead responds in the conversational manner that is normally supported by the lightweight audio communication system. This would be represented as:

1. Initial turn, followed by state assessment
2. Recipient: Recorded message
3. Initiator: Recorded reply
4. Recipient: Reply As in the three-turn model, the fourth turn (the live recipient reply) is framed in the highly functional context of the lightweight audio communication channel and is similarly likely to be a "targeted response." This embodiment is illustrated in FIG. 8. For clarity, the flowchart will be explained in the context of Example 3 operating in the network architecture depicted in FIG. 2. At 810 the procedure is initiated when the initiator pushes the PTT function button on the initiator's handset and the initial PTT request has been received and acknowledged by the session management module executing on the server. During the initial turn at 812 the initiator begins a first turn at talk and the audio processing module executing on the server is directed by the session management module to begin buffering the audio stream that contains the first turn being transmitted from the initiator's handset. At 814, the state assessment module executing on the server retrieves the current network state of the recipient's handset from the network status module, resulting in an assessment of the recipient's state. At 816 this assessment is used to decide whether the message will be passed through the lightweight audio channel or recorded for later retrieval. That is, if the assessment at 816 is that the recipient's handset is on the network and capable of receiving the audio stream corresponding to the initiator's first turn, the audio stream is transmitted by the audio processing module to the recipient's handset at 818 (for playback at the recipient's handset) and the procedure ends at 820.

However, if the assessment at 816 is that the recipient's handset is not capable of receiving the audio stream, at 822 a recorded response is transmitted from the audio processing module to the initiator's handset as a second turn by the audio processing module. As previously mentioned, the content of the recorded response can also be partly or wholly generated by the system. Once the recorded response has been transmitted to the initiator's handset for playback, the session management module waits for a specified period of time for a response from the initiator. A determination is made at 824 as to whether the initiator is engaging, that is, opting to reply to the recipient's recorded response message. One indicator of such responsive engagement is when the initiator presses the PTT function button on the initiator's handset. If the initiator does not reply within the specified period of time, the procedure ends at 826. If the initiator does reply, in this example embodiment in the form of a recorded message, the session management module causes the audio processing module to transmit the initiator's third turn response at 828. (In another embodiment, the system allows the initiator to retrieve the recorded initial turn and incorporate the audio into the third turn message.) A determination is made at 830 as to whether the recipient is engaging, that is, opting to reply to the initiator's recorded reply message. One indicator of such responsive engagement is when the recipient presses the PTT function button on the recipient's handset. If the recipient does not reply within the specified period of time, the procedure ends at 832. If the recipient does reply, the session management module causes the audio processing module to transmit the recipient's fourth turn 834 and the procedure ends at 836.

The various examples of system operation provided herein should make apparent certain additional advantages of the disclosed invention compared to the operation of conventional telephone voicemail. (Particular advantages may accrue from certain embodiments but not from others.) First, the usual inter-turn delays imposed by half-duplex, PTT operation provide some additional time resources for the initiator's formulation of a reply. The initiator may push the PTT button when ready, as opposed to responding synchronously to the "beep" of voicemail. Second, certain embodiments make it possible to provide more "context" about the recipient's state than a simple message of unavailability. This can simplify the initiator's reply formulation in that the initiator can take this context into account to shorten the message (as opposed to the frequent voicemail occurrence where the initiator has to include multiple conditional "replies" in the message because there are several possible states the recipient could be in). Third, framing the initiator's reply in the functional, topic-oriented nature of talk in half-duplex, PTT systems will tend to keep the reply in a similar frame. That is, the initiator's reply is likely to be more of a topical "targeted response" than in a voicemail interaction. Voicemail messages frequently take the form of monologues with many elaborations, partly for the inadequate context mentioned previously, but also because people recording a voicemail message tend to include the standard portions of a telephone conversation (e.g., greetings, initial inquiries and status updates, etc.) that they would use if the recipient had actually answered.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer," as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed:

1. A system for interactive communication among audio communication devices, comprising:
   a network device to facilitate communication between a first audio communication device and a second audio communication device over a network, comprising:
      network status module to determine a status of the network with respect to the second audio communication device;
      a state assessment module to receive device data comprising at least one of manual state data and context state data from the second audio communication device and the network status from the network status module, and to determine an availability of the second audio communication device to receive a communication request based on the device data and the network status;
      a session management module to receive an initial message from the first audio communication device that is directed to the second audio communication device, to produce a response message to the initial message that is tailored to one of the device data and the network status when the second audio communication device is unavailable to receive the communication request, and to determine whether the first audio communication device initiates a reply to the response message by recording a reply message that is directed to the second audio communication device; and
      an audio processing module to send the response message to the first audio communication device, and to send the reply message when the first audio communication device initiates the reply to the response message.

2. The system according to claim 1, wherein the state assessment module evaluates state assessment data comprising at least one of the network status, the context state data, and the manual state data.

3. The system according to claim 1, wherein the manual state data is determined by an input control component located on the second audio communication device and the context state data is determined by a context sensor included in the second audio communication device.

4. The system according to claim 2, wherein the state assessment data is received on the first audio communication device.

5. The system according to claim 2, wherein the initial message is processed comprising at least one of being transmitted through a communication network to the second audio communication device and being recorded for later retrieval, based on the state assessment.

6. The system according to claim 1, wherein the network status indicates whether the second audio communication device is present on the network.

7. The system according to claim 2, wherein the session management module directs transmission of the initial message when the state assessment data indicates that the second audio communication device is present on a communication network and capable of receiving the initial message.

8. The system according to claim 1, wherein the context state data is determined from context sensor data comprising at least one of proximity, location, and environment data.

9. The system according to claim 8, wherein the context sensor data is provided by at least one member selected from the group consisting of proximity sensors, location sensors, environment sensors, and microphones.

10. The system according to claim 1, wherein the manual state data indicates whether the second audio communication device is set to accept the initial message.

11. The system according to claim 2, wherein the state assessment data is retrieved following receipt of an acknowledgment message from the second audio communication device, wherein the acknowledgment message indicates that the initial message has been played.

12. The system according to claim 2, wherein the state assessment data is retrieved prior to receipt of an acknowledgment message from the second audio communication device, wherein the acknowledgment message indicates that the initial message has been played.

13. The system according to claim 1, wherein the session management module terminates communication between the first audio communication device and the second audio communication device when the first audio communication device does not initiate the reply to the response message.

14. The system according to claim 1, wherein the response message is received by the first audio communication device as an audio stream through an audio channel and the reply message is recorded as a further audio stream through the audio channel, and further wherein the audio stream and the further audio stream are buffered.

15. The system claim 14, wherein the audio channel is monitored for at least one of the response message and the reply message.

16. The system according to claim 1, wherein a pause is generated for a specified period of time after the response message is transmitted to the first audio communication device.

17. The system according to claim 1, wherein the response message is generated by determining at least one of full content and partial content.

18. The system according to claim 1, wherein the response message indicates that the second audio communication device is not capable of receiving the initial message.

19. The system according to claim 1, wherein the response message indicates that the second audio communication device is in an inappropriate context for receiving the initial message.

20. The system according to claim 1, wherein the response message indicates that the second audio communication device is not set to accept the initial message.

21. The system according to claim 1, wherein the audio processing module further transmits additional audio messages between the first audio communication device and the second audio communication device.

22. The system according to claim 21, wherein at least one of the additional audio messages is transmitted to the first audio communication device when the second audio communication device initiates a response to the reply message.

23. A system for interactive communication among audio communication devices, comprising:
   a server to facilitate communication between a first audio communication device and a second audio communication device over a network, comprising:
      a network status module to determine a status of the network with respect to the second audio communication device;
      a state assessment module to receive device data comprising at least one of manual state data and context state data from the second audio communication device and the network status from the network status module, and to determine an availability of the second audio communication device to receive a communication request based on the device data and the network status;

a session management module to receive an initial message from the first audio communication device that is directed to the second audio communication device, to produce a response message to the initial message that is tailored to one of the device data and the network status when the second audio communication device is unavailable to receive the communication request, and to determine whether the first audio communication device initiates a reply to the response message by recording a reply message that is directed to the second audio communication device; and an audio processing module to send the response message to the first audio communication device, and to send the reply message when the first audio communication device initiates the reply to the response message.

24. A system for interactive communication among audio communication devices, comprising:

an audio communication device to facilitate communication with another audio communication device over a network, comprising:

a network status module to determine a status of the network with respect to the other audio communication device;

a state assessment module to receive device data comprising at least one of manual state data and context state data from the second audio communication device and the network status from the network status module, and to determine an availability of the second audio communication device to receive a communication request based on the device data and the network status;

a session management module to receive an initial message from the audio communication device that is directed to the other audio communication device, to produce a response message to the initial message that is tailored to one of the device data and the network status when the other audio communication device is unavailable to receive the communication request, and to determine whether the audio communication device initiates a reply to the response message by recording a reply message that is directed to the other audio communication device; and an audio processing module to send the response message to the audio communication device, and to send the reply message when the audio communication device initiates the reply to the response message.

25. A system for interactive communication among audio communication devices, comprising:

means for maintaining a network device to facilitate a communication between a first audio communication device and a second audio communication device over a network, comprising:

means for determining a status of the network with respect to the second audio communication device;

means for receiving device data comprising at least one of manual state data and context state data from the second audio communication device and for receiving the network status, and further means for determining an availability of the second audio communication device to receive a communication request based on the device data and the network status;

means for receiving an initial message from the first audio communication device that is directed to the second audio communication device;

means for producing a response message to the initial message that is tailored to one of the device data and the network status when the second audio communication device is unavailable to receive the communication request;

means for sending the response message to the first audio communication device;

means for determining whether the first audio communication device initiates a reply to the response message by recording a reply message that is directed to the second audio communication device; and means for recording the reply message when the first audio communication device initiates the reply to the response message.

26. A system for interactive communication among audio communication devices, comprising:

a state assessment module to determine an availability of a second audio communication device to accept a communication request from a first audio communication device based on at least one of network status data, manual state monitoring data, and context-based state monitoring data;

a network status monitoring module to receive the network status data for the second audio communication device;

a manual state monitoring module to monitor activity of at least one control input device, wherein the at least one control input device comprises a component of the second audio communication device, and to determine the manual state monitoring data retrieved from the control input device;

a context-based state monitoring module to monitor at least one context sensor included in the second audio communication device and to receive the context-based state monitoring data from the context sensor;

a session management module to manage a communication over a network among the first audio communication device and the second audio communication device, to receive an initial message from the first audio communication device that is directed to the second audio communication device, to produce a response message to the initial message that is tailored to at least one of the network status data, the manual state monitor data, and the context-based state monitoring data when the second audio communication device is unavailable to receive the communication request, and to determine whether the first audio communication device initiates a reply to the response message by recording a reply message that is directed to the second audio communication device; and an audio processing module to transmit the response message to the first audio communication device, and to send the reply message when the first audio communication device initiates the reply to the response message.

* * * * *